(12) United States Patent
Bonnel et al.

(10) Patent No.: US 8,863,653 B2
(45) Date of Patent: Oct. 21, 2014

(54) COOKING UTENSIL WITH EXTENDED ANTI-DEFORMATION SLOTS

(75) Inventors: Jocelyn Bonnel, Vions (FR); Pascal Cuillery, Faverges (FR)

(73) Assignee: SEB S.A., Ecully (FR)

( * ) Notice: Subject to any disclaimer, the term of this patent is extended or adjusted under 35 U.S.C. 154(b) by 685 days.

(21) Appl. No.: 12/671,563

(22) PCT Filed: Jul. 16, 2008

(86) PCT No.: PCT/FR2008/001049
§ 371 (c)(1),
(2), (4) Date: Mar. 25, 2010

(87) PCT Pub. No.: WO2009/030838
PCT Pub. Date: Mar. 12, 2009

(65) Prior Publication Data
US 2011/0226136 A1    Sep. 22, 2011

(30) Foreign Application Priority Data
Aug. 1, 2007  (FR) ...................................... 07 05641

(51) Int. Cl.
| | | |
|---|---|---|
| A47J 27/00 | (2006.01) | |
| A47J 27/022 | (2006.01) | |
| A47J 36/02 | (2006.01) | |

(52) U.S. Cl.
CPC ................. *A47J 27/022* (2013.01); *A47J 36/02* (2013.01)
USPC ........................................................... 99/422

(58) Field of Classification Search
USPC ..................... 99/422–425, 427–428, 430–431
See application file for complete search history.

(56) References Cited

U.S. PATENT DOCUMENTS

| | | | | |
|---|---|---|---|---|
| 1,408,256 | A | * | 2/1922 | Boehl .............................. 99/422 |
| 1,913,337 | A | * | 6/1933 | Manicke .......................... 99/450 |
| 4,574,777 | A | * | 3/1986 | Bohl et al. .................. 126/390.1 |
| 5,357,850 | A | * | 10/1994 | Coudurier ....................... 99/422 |
| 5,487,329 | A | * | 1/1996 | Fissler ............................. 99/403 |
| 5,647,271 | A | * | 7/1997 | Capelle et al. ................... 99/422 |
| 6,422,233 | B1 | * | 7/2002 | Bhagat ........................ 126/390.1 |

FOREIGN PATENT DOCUMENTS

| | | | |
|---|---|---|---|
| EP | 1 053 711 | | 11/2000 |
| FR | 2 693 093 | | 1/1994 |
| FR | 2 801 485 | | 6/2001 |
| JP | 2000023829 | A * | 1/2000 |
| WO | 2006/126848 | | 11/2006 |

OTHER PUBLICATIONS

International Search Report dated Feb. 4, 2009, from corresponding PCT application.

* cited by examiner

*Primary Examiner* — Gene Kim
*Assistant Examiner* — Amir Klayman
(74) *Attorney, Agent, or Firm* — Young & Thompson

(57) ABSTRACT

A cooking utensil includes a base (3) doubled underneath via an insert (1a) made from a hard material with openings (7) crossing the insert for the fixing thereof to the base. At least some of the openings are in the form of elongated slots (31a) individually defining over the length thereof, a global arched form with opposing end portions either leading to the centre of the insert or to the external periphery (10a) of the insert.

17 Claims, 4 Drawing Sheets

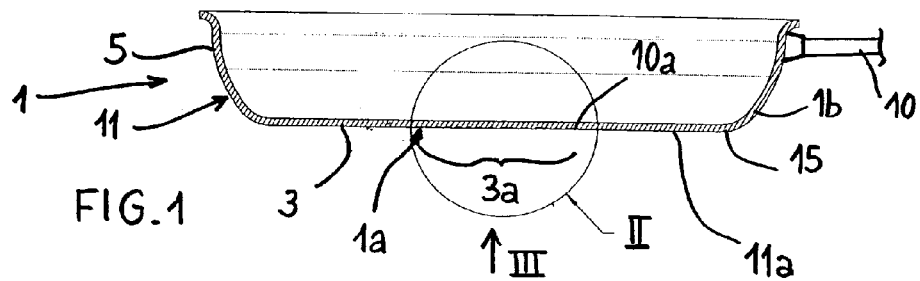
FIG.1
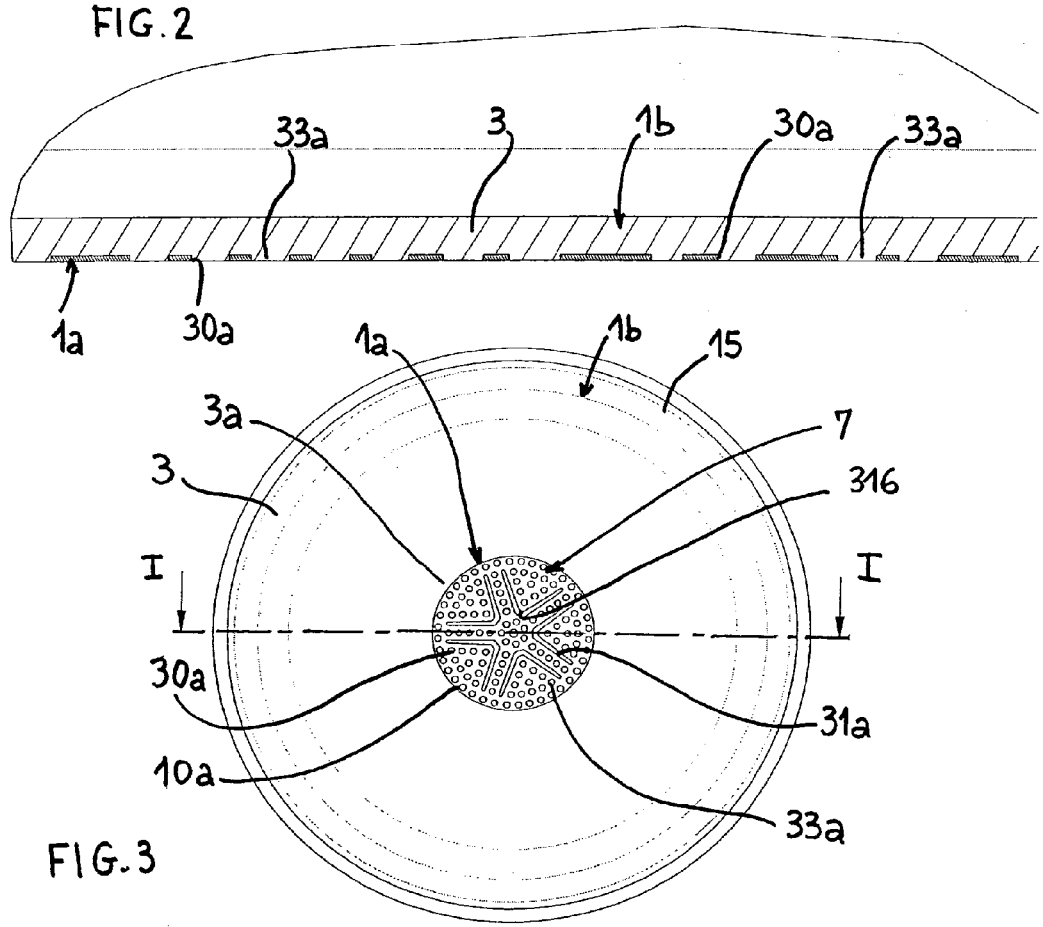
FIG.2
FIG.3

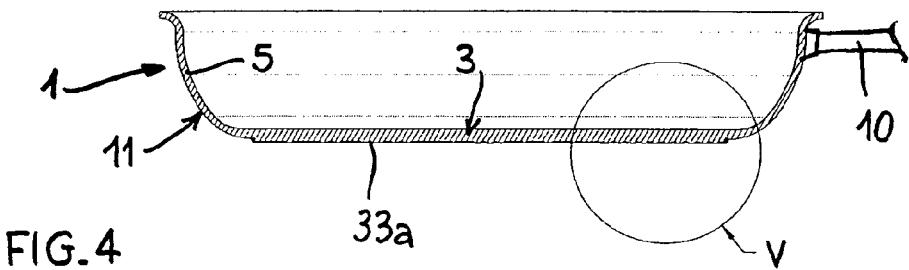
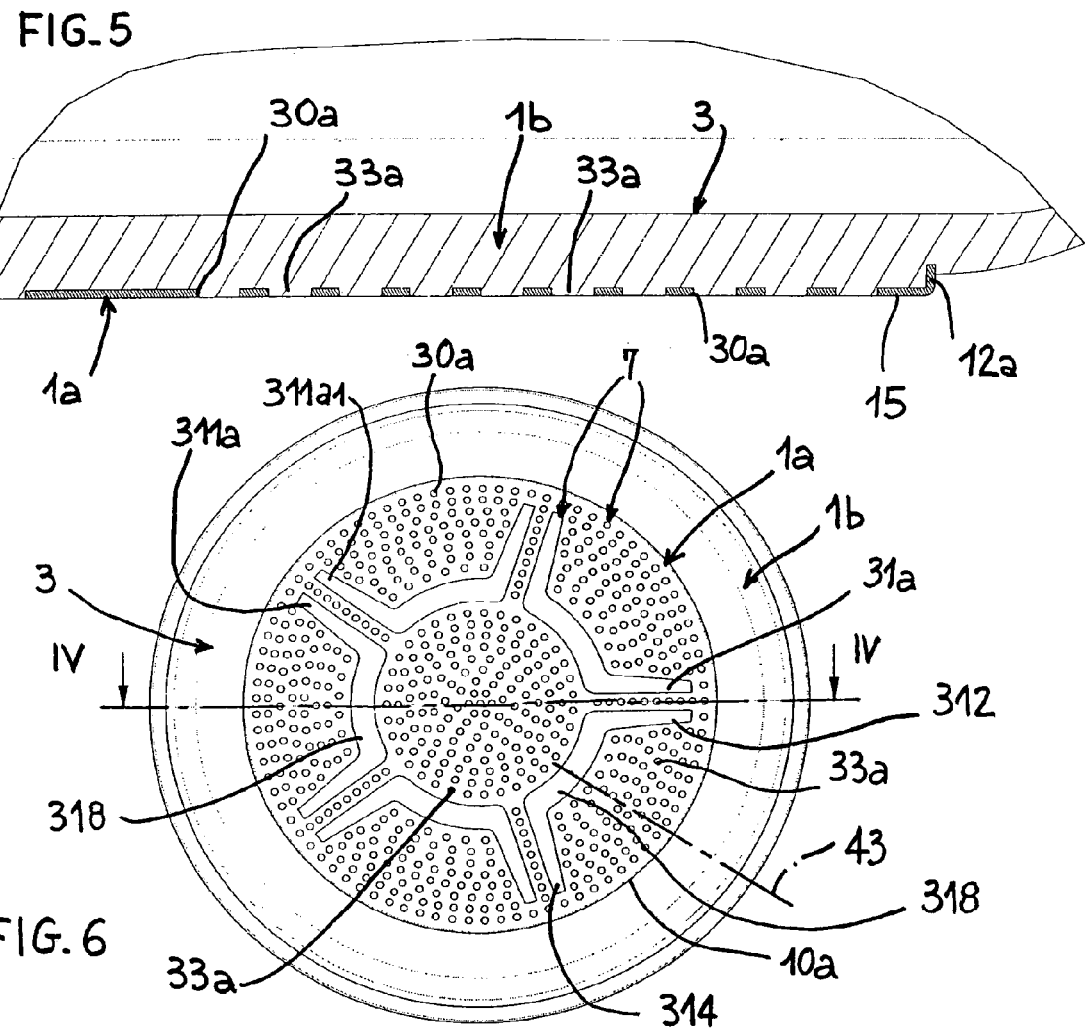

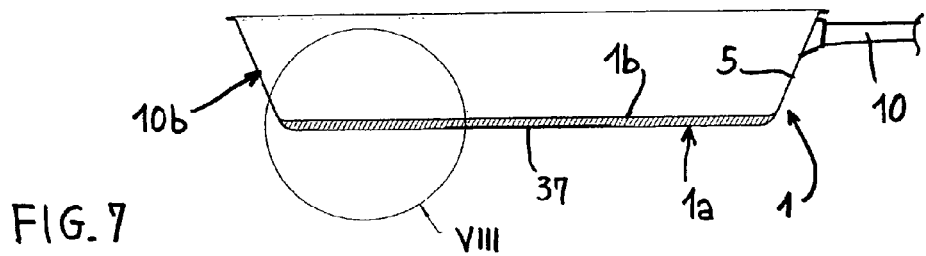
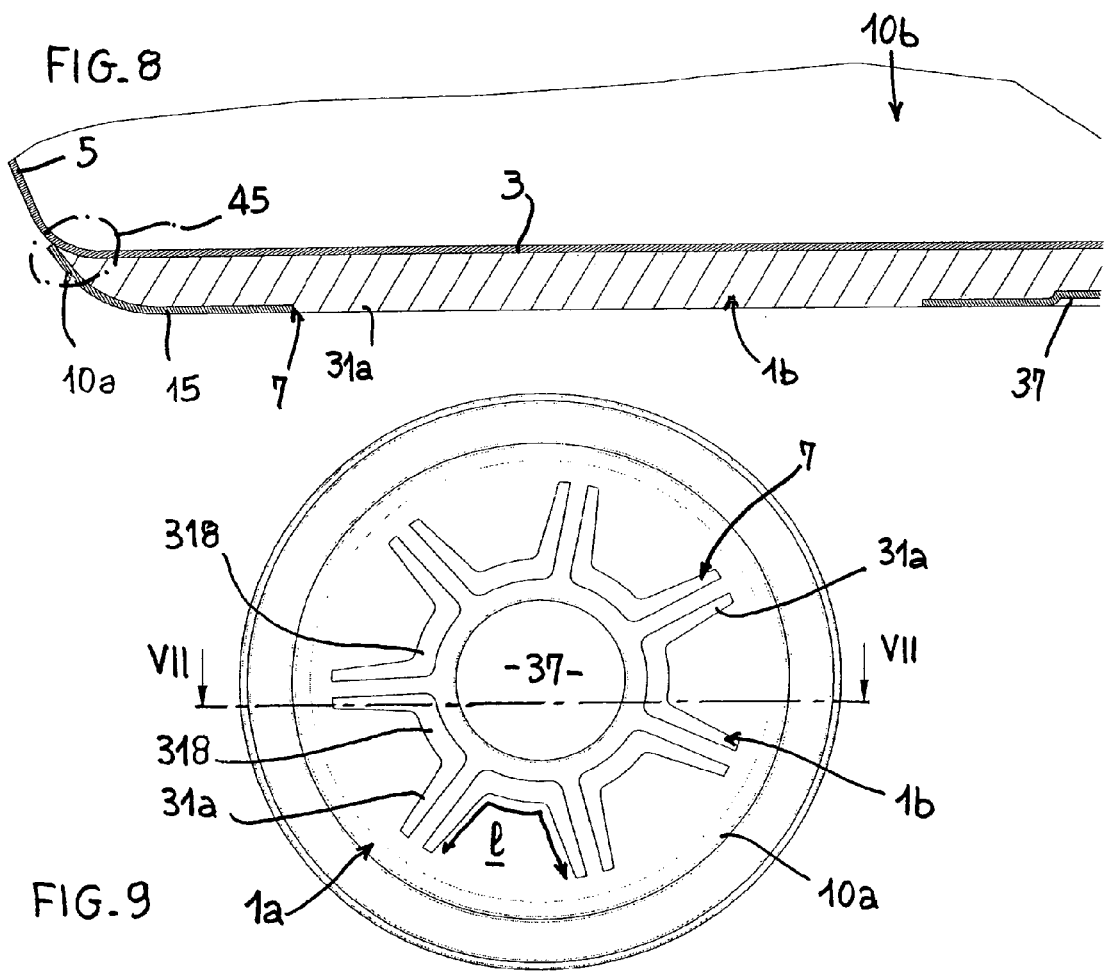

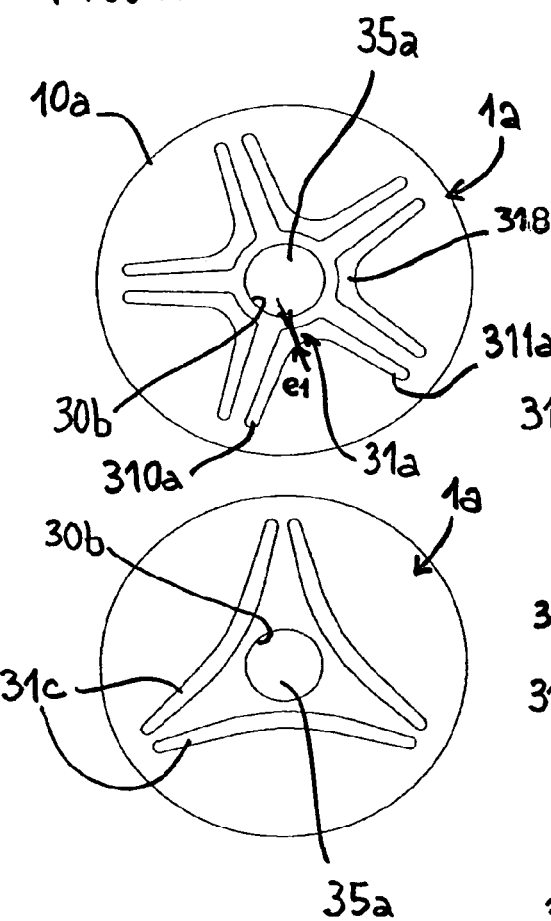
FIG. 10
FIG. 11
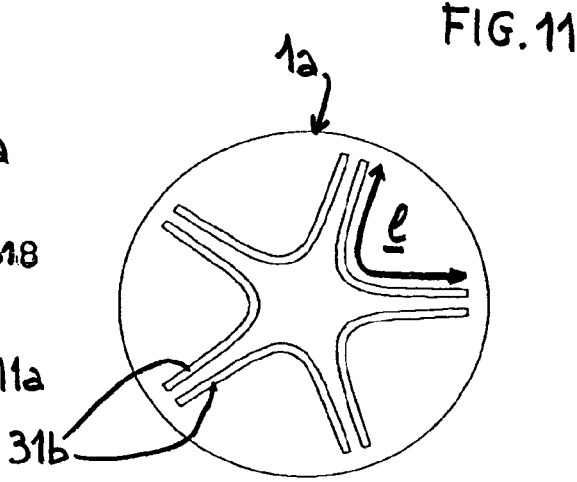
FIG. 12
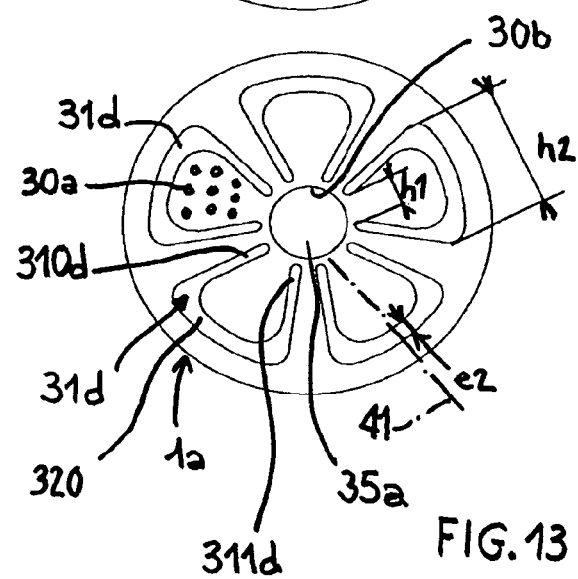
FIG. 13

COOKING UTENSIL WITH EXTENDED ANTI-DEFORMATION SLOTS

The invention relates to a cooking utensil comprising a base doubled underneath by means of an insert in a hard material with openings passing through said insert, in particular, for the fixing thereof to the base.

WO 2006/126848 presents such a cooking utensil. Here, the base belongs to a cap in aluminium. FR-A-2693093 is another example which discloses a cooking utensil where at least some of said openings appear as elongated slots individually defining over their length, a global arched shape.

However progress further needs to be made, in particular in connection with the following problems:
  resistance to deformation of the base during the manufacturing of the utensil, and in a still more important way, over time,
  coupling between the heating power intensity to which the utensil is subject during its use and its capacity of being heated by induction in a performing way, from the moment that materials compatible with this type of heating will have been used,
  adhesion of the insert in a harder material to at least one portion of the softer material of the base.

The following compromise is in particular intended:
  reduce the surface area of the insert in hard material, via the openings which are made therein,
  preserve a suitable insert surface area in order to ensure compatibility of the utensil with the existing heating systems by induction.

In order to meet all or part of the aforementioned goals and compromises, it is first proposed that at least some of the aforementioned openings (defined by slots with a global arched shape) have elongated opposite end portions, all either leading to the centre of the insert, or to the outer periphery of this insert.

This contributes to good mechanical strength, and, for reducing the surface area of the insert, other choices are preferred such as additional holes, which are efficient in terms of heating performance by induction.

Thus, it is recommended not to (exclusively) provide openings with the shape of angular sectors and/or radial slots, as in FR 2693093, nor any branched slots, in the fashion of the slots such as 14b in WO 2006/129848, the number of free ends of which is greater than two.

Further, by comparison with this latter document, it is recommended that the slots be with a closed contour, those (14a) of the latter document either opening out at the outer periphery or on a large central orifice. A closed contour improves mechanical strength.

For a performing attachment of the added-on insert, it is recommended that the aforementioned base includes a first material much softer than that of the insert, the openings including said elongated slots which pass through it, being filled with this first rather soft material such as aluminium.

Taking into account the different manufacturing techniques which may be contemplated, it is moreover recommended in particular:
  either that said base belongs to a cap at least essentially made in one/said first softer material than that of the insert and that this insert is, through these through-openings (including the elongated slots), recess-fitted into said first material,
  or that the base comprises a layer in one/said softer material than that of the insert, said layer being interposed between:
    the insert which is, as above, recess-fitted into the first material,
    and a base wall of a cap in another harder material than that of said layer, such as a stainless steel.

Other features related to the present object and to practical embodiments of the latter follow, in connection with drawings given as non-limiting examples and wherein:

FIG. 1 is a schematic view of a cooking utensil, essentially in a vertical sectional view, along the sectional line I-I of FIG. 3, FIG. 2 corresponds to the detail II of FIG. 1, FIG. 3 is a view of the base of the article of FIG. 1, in the direction of the arrow III, completed by symmetry, the groups of FIGS. 4, 5, 6 and 7, 8, 9 show other embodiments according to the same illustrations as in FIGS. 1-3, and FIGS. 10, 11, 12, 13 are schematic views, each of an insert according to the same view as the one of FIGS. 3, 6, 9 with every time an alternative embodiment. The small fillings of more malleable material which were shown in FIGS. 3, 6, 9 are no longer systematically illustrated. Their presence is incidentally not imperative, although recommended (see FIG. 13). Those at the location of the centre of the base or in close proximity thereto may be replaced with a single filling of larger diameter, as illustrated in FIGS. 10, 12 and 13, as an example.

In the present description, any kitchen item typically comprising at least one handle 10 and a (hollow) cap 10b (FIG. 7) or 11 (FIGS. 1, 4) receiving the food or the preparation to be heated or cooked will be called a "cooking utensil". The base of the cap is a sensitive portion, since it is the most subject to heat from a suitable source. Frying pans, saucepans . . . are also relevant.

In the figures, the cooking utensil, always referenced as 1, comprises a portion in a hard material 1a, metal here, which will be inserted under the utensil into a portion of softer material 1b, also a metal here. Both portions are assembled in order to form a performing strengthened base.

Here, the portion or grid 1a is in a ferromagnetic material compatible with heating the utensil by induction. It may be in a stainless steel. The portion 1b at least at the location of the base 3 is in a good heat-diffusing material. Aluminium is suitable.

In FIGS. 1-6, portion 1b is preferably in one piece, as illustrated, and therefore has a transverse base wall 3 from which a sidewall 5 is erected. It has a hollow cap shape. The handle is attached to it.

At least one portion of its base wall is thus doubled underneath by a hard metal portion, 1a, defining a base insert which may have been perforated or cut locally.

It should be understood that in reality the illustration of the utensil base as in FIG. 1 is not with a flat lower face 11a, but curved or recessed, with a convexity towards the top, in order to ensure a position below for a base area 15 with a peripheral span.

Further, originally, the insert 1a may in particular be plate-shaped, as in FIG. 1 or rather as a capsule, then with a raised peripheral edge 12a, as in FIG. 5. In the case of FIG. 7, its final shape has become recessed, after its connection under pressure with the softer base 1b. In FIG. 1, the insert 1a is limited in size to the surroundings of the central portion 3a of the base 3, see also FIG. 3. It therefore substantially remains in its original form, without any raised peripheral edge. Edge shapes other than that of FIG. 5 are possible, such as rim (with an outer shoulder), or a more flared edge.

In every case, the insert 1a is fixed by recess-fitting it into the softer base, via orifices 7 which pass right through it and are closely filled with the soft metal of this base wall. The insert 1a, with these orifices, promotes resistance to deformation of the base.

As this will be more clearly understood considering FIGS. 2, 5 and 8, the orifices 7 may be of one or several natures. First, they comprise anti-deformation elongated slots 31a, 31b . . . either all with identical shapes of not. Next, other openings may in particular complete the attachment by recess-fitting, such as circular fillings of small diameter 33a, and/or a central filling with a larger diameter 35a (FIGS. 10, 12, 13) in the location of the corresponding openings, circular openings here, with small and large diameters 30a, 30b respectively, passing through the insert in FIGS. 2 and 12.

In FIG. 11, only the elongated slots 31b ensure the insert-base connection of the cap.

In FIGS. 7-9, a wide central portion, discoidal here, is occupied by a recessed area 37 of the insert which increases the stiffness and the attachment by recess-fitting of this insert and promotes the heating capability by induction since there is no passing through of the soft base material 1b and in that the insert, if it is ferromagnetic, is sensitive to magnetic waves from an induction coil.

Whatever the case, for the sake of mechanical performance and for favourably tending to the compromise(s) mentioned above, it is recommended that these orifices 7, when they exist, should be with a closed contour, in particular the slots 31a, 31b, 31c . . . .

Concerning these elongated slots 31a . . . 31d, here an essential aspect of the invention, they therefore define over their length (referenced as 1 in FIGS. 9, 11) a global arched shape, with opposite end portions—such as 310d, 311d in FIG. 13 or further 310a, 311a in FIG. 10—which all lead either towards the centre of the insert 1a (i.e. oriented in its direction), as in FIG. 13, or towards its outer periphery 10a (as in all the other figures and notably FIGS. 1, 6 and 10).

As this has already been indicated, these elongated slots exclusively have the two aforementioned opposite end portions, such as 310a and 311a for the slots 31a, without any other intermediate ends, unlike the ramifications which may be noted in WO 2006/126848.

Following a campaign of tests and in order to reach the sought compromise with high mechanical performance, it is recommended that these opposite end portions of the elongated slots (31a, 31b . . . ) should each be substantially parallel to one of the end portions of an adjacent slot, such as in 311a, 311a1 for the slots 31a, 31a1 in FIG. 6 as an example.

It will have been understood that what is designated as "end portions" of an elongated slot is at least the end portion of each side branch—such as 312, 314 in FIG. 6—of such a slot, or even the whole branch. The "substantially parallel" aspect will be appreciated as tending towards this parallelism.

In the figures which show the base viewed from the bottom, it will have been noted that the elongated slots 31a, 31b . . . are arranged as a star around the centre of said part. This is favourable for good mechanical stability and for a performing distribution of the heating areas.

For these reasons and for favouring the intended compromise, it is moreover recommended that both side branches or portions of the slots should be rectilinear and joined together through a rectilinear central portion (316 in FIG. 3) or curved with a convexity oriented towards the periphery 10a of said base, thus like said central portion 318 in FIG. 6 or 9 between the branches 312, 314, see also the central portion 320 in FIG. 13.

The "rectilinear solution" is in particular recommended for discoidal inserts of small diameter.

For industrially making the slots, two or three routes are recommended for tending towards the targeted goals here.

First, follow the route illustrated by FIGS. 6, 9, 10 wherein:
the arch formed by each elongated slot, such as 21a, has a central portion, such as 316 or 618, located closer to the centre of the insert 1a than are said end portions, such as 310a, 311a,
and the slots preferably have a larger width towards their central portion, see width e1 in FIG. 10, than towards their end portions, such as 310a, 311a.

Otherwise, make the slots, as in FIG. 13 wherein:
the arch of the (broad) lobe or further the petal-shape defined by each slot 31d has a central portion 320 located closer to the outer periphery of the insert than are said end portions, here 310a, 311d,
and these slots then have a larger width e2 towards their central portion than towards their end portions.

The third solution [illustrated in FIGS. 3, 11, 12] which corresponds to the first, except that the width of the elongated slots is constant over substantially the whole of their length, is a priori rather reserved for inserts of small diameters. Exceptions are however possible.

Notably regarding the shape of the arches as favourably defined by the elongated slots for good mechanical stability of the base, including the strong heat gradients which may occur, it will be understood that different choices are possible.

Thus, in FIG. 12, an embodiment is recommended, having at least three arches 31c of equal lengths to be positioned centred on the base in the fashion of an isosceles triangle with convex arched sides towards the centre and with apices where the arches remain separate two by two.

In FIG. 13, the arches are positioned around the centre, while defining several radial petals 31d, five here, each having a convexity oriented towards the periphery of the base 3.

Still in FIG. 13, the arches individually are U-shaped, with two side portions symmetrical relatively to the relevant radial axis, such as 41 for the arch which it intersects. The distance, such as h1, between the side portions of the U, at their free end which is closer to the centre than the central portion which joins these side portions, is smaller than the length h2 of this central portion.

On the contrary, in FIGS. 3, 9, 10-12, the arches individually have the shape of a U, flared in the direction of the periphery 10a of the base, with two symmetrical portions (such as 312, 314 in FIG. 6) relatively to a radial axis, as the one referenced as 43 in the same figure.

As this has been already indicated earlier in the description, it will be noted in FIGS. 3, 6 (but this notice is applicable to other slot geometries) that openings 30a, filled by the first ("soft") material 1b following a non-elongated closed contour, circular here, and closer to the centre of the face than the slots (31a here), pass through the insert 1a.

This is favourable to the targeted goals, including anti-deformation.

The fact is also that, favourably:
if the arch formed by each elongated slot has a central portion located closer to the centre of the part than are said end portions, like on all the illustrated exemplary embodiments except FIG. 13,
then, other said openings (still referenced as 30a) filled with the first soft material and preferably having a circular contour, pass through the insert 1a.

In particular in the case of FIG. 13 where the central portions 320 of the slots define together a discontinuous annular shape close to the periphery of the insert 1a (but application to other cases is possible), other said openings (referenced as 30a and only some of them are illustrated) pass through the insert. Again, these openings are filled with the base soft material, preferably following a circular contour, and are located inside said global arched shape defined by each elongated slot 31*d*.

For making the utensils, it is recommended to proceed as follows:

First, without coming back to the possible riveting, it is in particular possible to resort to stamping, either cold stamping (room temperature) or hot stamping.

For the first case, it is possible to start with a soft metal block, such as the aforementioned aluminium, and either this block will be conformed in order to obtain a cap (such as 11) with joint recess-fitting of the insert, or the base 3 will be formed first also with recess-fitting of the insert 1*a*, after which the soft metal will again be deformed in order to erect the sidewalls of the cap.

Possible local supplements, such as a copper disk, may be provided, in particular at the periphery of the base, towards its connection with the sidewall, so that the cap will remain at least essentially made from one/said material softer than the one of the insert.

In the case of the embodiment of FIGS. 1-3, one started with a hard metal insert 1*a* appearing here as a small disk which was centred on the softer base 3. Cold stamping has generated the recessed fitting of the insert: all the orifices 7 (elongated slots 31*a*, extra-apertures 30*a*) are then filled with the soft metal (fillings 33*a*).

In the comparable case of the embodiment of FIGS. 4-6, the recessed fitting of the insert 1*a* was achieved from a capsule with a raised peripheral edge 12*a*. Under the pressure of the mould, again with cold stamping, the softer material flowed into the orifices 7 and the peripheral edge 12*a* was recess-fitted into this metal until the situation of FIG. 5 is obtained (with possibly one edge 12*a* oriented differently).

In the case of the embodiment of FIGS. 7-9, the recessed fitting of the insert 1*a* was achieved by hot stamping. The cap 10*b* is here in a hard material, such as stainless steel, and has been preformed. A layer 1*b* originating from a softer material block, such as aluminium, with a lower melting point than that of the materials of the solid base 3 of the cap and of the hard insert 1*a* (stainless steel here) is interposed between base 3 and insert 1*a*. The heat and the stamping caused flow of the softer material which filled the orifices 7 of the insert on the one hand and peripheral bending of this insert on the other hand, in particular if one started with a plate-shaped insert. An initial capsule shape is however preferred, stamping causing coincidence of the edges of the insert and of the cap, the area 45 in FIG. 8, and also causing the soft metal to move upwards in this area for intimate attachment between the insert, the deformed soft block 1*b* and the base of the cap.

The inserts 1*a* with their slot shapes of FIGS. 10-13 are compatible with one of the techniques above.

It will be noted that the section of the orifices 7, and in particular of the holes 30*a*, will not necessarily be cylindrical. Thus, a frusto-conical section may for example be contemplated.

The invention claimed is:

1. A cooking utensil comprising a base (1*b*, 3) incorporating an insert (1*a*) in a hard material, openings (7) passing through said insert for attachment with the base, at least some of the openings defining elongated slots (31*a*, 31*b*, 31*c*, 31*d*) that are generally arch-shaped in plan view and that each include a pair of elongated sides and a central portion that joins the elongated sides, characterized in that at least some of said slots (31*a*, 31*b*, 31*c*, 31*d*) have longitudinally opposite end portions (310*a*, 311*a*; 310*d*, 311*d*) which are elongated in plan view, wherein all of the end portions of a particular slot either lead to the centre of the insert (1*a*), or lead to the outer periphery of said insert, said opposite end portions (310*a*, 311*a*, 310*d*, 311*d*) of the elongated slots are respectively substantially parallel to one of said end portions of an adjacent elongated slot.

2. The utensil according to claim 1, characterized in that the insert (1*a*) is discoidal and said longitudinally opposite end portions of said slots extend substantially radially.

3. The utensil according to claim 1, characterized in that said elongated slots (31*a*, 31*b*, 31*c* . . . ):
have two opposite end portions (310*a*, 311*a*, 310*d*, 311*d*), and therefore two ends, exclusively, and/or
have a closed contour.

4. The utensil according to claim 1, characterized in that the end portions (310*a*, 311*a*, 310*d*, 311*d*) of the elongated slots belong to two rectilinear side portions joined together through a central rectilinear portion or a curved portion having a convexity oriented towards the periphery (10*a*) of said base.

5. The utensil according to claim 1, characterized in that:
said arch formed by each elongated slot (31*d*) has a central portion located closer to the outer periphery of the insert than are said end portions (310*a*, 311*a*, 310*d*, 311*d*).

6. The utensil according to claim 1, characterized in that:
said arch formed by each slot (31*a*, 31*b*, 31*c*) has a central portion located closer to the centre of the insert (1*a*) than are said end portions,
and these slots have a larger width towards their said central portion than towards their said end portions.

7. The utensil according to claim 1, characterized in that it comprises three said arches (31*c*) of equal lengths positioned centred on said base, in the fashion of an equilateral triangle having convex arched sides towards the centre and with separated apices.

8. The utensil according to claim 1, characterized in that the arches are positioned around the centre, while defining several radial petals (31*d*), each having a convexity oriented towards the periphery (10*a*) of said base.

9. The utensil according to claim 8, characterized in that the arches (31*d*) which are distinct from each other, individually have the shape of a U, with two symmetrical portions relatively to a radial axis (41), the distance (h1) between the side portions of the U, at a free end thereof which is closer to the centre than the central portion which joins these side portions, being smaller than the length (h2) of said central portion.

10. The utensil according to claim 1, characterized in that the arches individually have the shape of a U flared in the direction of the periphery (10*a*) of the base, with two portions symmetrical relatively to a radial axis (41, 43).

11. The utensil according to claim 1, characterized in that other openings (30*a*) having a substantially circular contour and which are located closer to the centre of the base than the elongated slots (31*a*, 31*b* . . . ) pass through the insert (1*a*).

12. The utensil according to claim 1, characterized in that:
said arch formed by each elongated slot (31*a*, 31*b*, 31*c*) has a central portion located closer to the centre of the insert than are said end portions, and
other openings (31*a*) having a substantially circular contour pass through said insert.

13. The utensil according to claim 1, characterized in that other openings (30*a*) having a substantially circular contour and located in the interior formed by said global arched shape defined by each elongated slot (31*a*, 31*b* . . . ) pass through said insert.

14. The utensil according to claim 1, characterized in that said base (1*b*, 3) belongs to a cap (11) at least essentially made from a first softer material than that of the insert (1*a*) and said insert is, through openings (30) including the elongated slots (31a, 31b, 31c) passing therethrough, recess-fitted into said first material, so that the base is defined by only two layers recess-fitted into each other.

15. The utensil according to claim 1, characterized in that the base (1b, 3) comprises a layer (1b) in a softer material than that of the insert (1a), said softer layer being interposed between:
    the insert (1a) which is, by said openings (7) which pass therethrough and which include the elongated slots (31a, 31b, 31c), recess-fitted into said first material,
    and a base wall (3) of a cap (10b) in a harder material than that of said softer layer (1b).

16. A cooking utensil comprising:
    a base (1b, 3) incorporating an insert (1a) in a hard material, and
    openings (7) passing through said insert for attachment with the base, at least some of the openings defining elongated slots (31a, 31b, 31c, 31d) that are generally arch-shaped in plan view and that each include a pair of elongated sides and a central portion that joins the elongated sides;
    characterized in that at least some of said slots (31a, 31b, 31c, 31d) have longitudinally opposite end portions (310a, 311a; 310d, 311d) which are elongated in plan view, all either leading to the centre of the insert (1a), or to the outer periphery of said insert, said opposite end portions (310a, 311a, 310d, 311d) leading to the centre of the insert are crossing toward the centre.

17. A cooking utensil comprising:
    a base (1b, 3) incorporating an insert (1a) in a hard material, and
    openings (7) passing through said insert for attachment with the base, at least some of the openings defining elongated slots (31a, 31b, 31c, 31d) that are generally arch-shaped in plan view and that each include a pair of elongated sides and a central portion that joins the elongated sides;
    characterized in that at least some of said slots (31a, 31b, 31c, 31d) have longitudinally opposite end portions (310a, 311a; 310d, 311d) which are elongated in plan view, all either leading to the centre of the insert (1a), or to the outer periphery of said insert, said opposite end portions (310a, 311a, 310d, 311d) leading to the outer periphery of the insert are crossing toward the outer periphery.

* * * * *